United States Patent [19]

Stepanek

[11] Patent Number: 5,902,436
[45] Date of Patent: May 11, 1999

[54] METHOD FOR TRANSFERRING A METALLIZED HOLOGRAPHIC IMAGE

[75] Inventor: Stephen B. Stepanek, Amherst, N.H.

[73] Assignee: Hampshire Holographic Manufacturing Corp., Milford, N.H.

[21] Appl. No.: 08/824,914

[22] Filed: Mar. 27, 1997

Related U.S. Application Data

[63] Continuation-in-part of application No. 08/679,349, Jul. 9, 1996, Pat. No. 5,723,203, and a continuation-in-part of application No. 08/655,000, Jul. 9, 1996, Pat. No. 5,746,865.

[51] Int. Cl.⁶ ............................................. B44C 1/165
[52] U.S. Cl. ........................ 156/233; 156/237; 428/209; 428/457; 428/914
[58] Field of Search ...................... 428/225, 245, 428/195, 200, 209, 457, 464, 914, 915, 916; 430/1, 2; 156/309.6, 233, 239, 237; 359/1

[56] References Cited

U.S. PATENT DOCUMENTS

| | | | |
|---|---|---|---|
| 4,773,718 | 9/1988 | Weitzen et al. | 359/3 |
| 4,893,887 | 1/1990 | Coates | 359/1 |
| 4,906,315 | 3/1990 | McGrew | 156/231 |
| 5,130,825 | 7/1992 | Kok-Schram De Jong | 359/15 |
| 5,281,499 | 1/1994 | Bussard | 430/1 |
| 5,455,129 | 10/1995 | Bussard | 430/1 |
| 5,593,765 | 1/1997 | Sharpe et al. | 428/225 |

*Primary Examiner*—Marie R. Yamnitzky

[57] ABSTRACT

A holographic image that has been transferred from a conventional polymeric support to an aluminum stock element is described in this invention. A host of images may be envisioned and since this image, on a aluminum stock element, may then be wound up in a roll, it can be used in the manufacture of cans, containers and the like. The aluminum stock element containing the holographic image may also be used in sheets for advertisements and the like. This element and process permits the wide spread use of such holographic images, such use not being available until now.

4 Claims, 2 Drawing Sheets

METHOD FOR TRANSFERRING A METALLIZED HOLOGRAPHIC IMAGE

CROSS-REFERENCE TO RELATED APPLICATIONS

This application is related to my previously filed applications U.S. Ser. No. 08/679,349, filed Jul. 9, 1996, now U.S. Pat. No. 5,723,203, Mar. 3, 1998, and U.S. Ser. No. 08/655,000, filed Jul. 9, 1996, now U.S. Pat. No. 5,746,865, May 5, 1998, and is a Continuation-in-part of both of these applications. This application is also related to Assignee's co-pending application U.S. Ser. No. 08/824,913, filed Mar. 27, 1997.

BACKGROUND OF THE INVENTION

1. Field of the Invention

This invention relates to holographic images formed by a unique process for various security and decorative purposes. Also, this invention relates to aluminized roll-stock holographic images formed on a plastic layer. Further, this invention relates to elements and process for transferring these holographic images to yet another substrate. Still further, this invention relates to a unique process for transferring holographic images from a carrier surface directly to the end use substrate thus eliminating the need to permanently laminate a holographic imaged film to the substrate itself (prior art). This permits a wider and more commercial use of the holographic image.

2. Description of the Prior Art

Holographically enhanced materials are well known in the prior art. These are usually made by very proprietary methods which include passing a layer of plastic, for example, through a machine which imparts a variation (e.g. which can be an image itself) within covering or upper strata of the plastic layer. This step is somewhat similar to, but not exactly the same, as embossing. A powdered metallic element (e.g. aluminum) is then applied thereon by the so-called metallizing process. After this step, the element appears to have a two or three dimensional diffractional grating holographic image imparted on the layer of plastic. This image is extremely pleasing and is widely used within the credit card and security industries, for example, to impart an image particular to that credit card or to provide a security element thereon. The resulting image is difficult to duplicate and thus these elements assist in the prevention of fraud by counterfeiting, for example. The draw-back to the use of these images is the cost since the machines to produce the image are complicated and costly in and of themselves. Additionally, holographic elements produced by this method (the so-called "shim" method) are usually small in size and thus cannot be imprinted with larger images. Thus, this material has not been widely used outside of the credit card and novelty industry.

There are other prior art process for the direct lamination of holographic images formed as taught above directly to another substrate. This step, however, leaves the holographic image and the substrate on which it was first formed, on the second substrate and this has at least two disadvantages. Firstly, it is extremely costly to leave the first substrate laminated to the second. Secondly, this second lamination tends to distort the image, change the physical properties and leaves the system with a bulky three and four layer product.

It is well-known in the industry to place images on aluminum roll-stock, such as that used to make aluminum cans and other aluminum containers. These images impart either the items contained therein or ingredients, price or simple advertising, for example. There is a long standing need, however, to provide holographic elements on to this aluminum roll stock in order to provide increased beauty and to otherwise enhance the logos, labels, identities and other information and decoration contained thereon.

Recently, a process for making large sheets of holographically enhanced material has been developed. Thus, the costs of such holographically enhanced material have been significantly reduced. However, these large sheets of material are usually placed on a plastic surface which is also rather expensive and thus the use of this material is still rather limited. If the holographic image could be further transferred to yet another substrate, one which was less expensive and one which had higher utility (e.g. aluminum roll stock used in the manufacture of cans and containers, for example), the use of holographically prepared images would find wider use in the use of this aluminum roll stock. Thus, there is a long-standing need in the packaging, wrapping and advertising industry to have a holographic image which can be directly laminated to a second surface and then delaminated therefrom, leaving the metallized holographic image on this second surface and leaving the polymeric substrate suitable for reuse by further metallization. More specifically, there is a long standing need to transfer decorative holographic images to aluminum roll-stock, roll-stock that can be further used to make cans and containers, for example

SUMMARY OF THE INVENTION

It is an object of this invention to provide a holographic image that can be transferred to another substrate. It is a further object to utilize a unique transferring process that can place a holographic image directly on to a metal substrate such as aluminum roll stocks, for example. These and yet other objects are achieved in an aluminum roll stock element, said aluminum roll stock element having a holographic image having imparted thereon by laminating a metallized holographic image on a polymeric substrate to an aluminum roll stock element under temperatures and pressure requisite to obtaining such lamination, and subsequently delaminating said aluminum roll stock element from said polymeric substrate wherein said holographic element is transferred to said aluminum roll stock element and said polymeric element can be metallized again for reuse.

In yet another embodiment, this invention may be achieved in a process for transferring a metallized holographic image imparted on a polymeric substrate to an aluminum roll stock element by laminating said metallized holographic image to said aluminum roll stock element at a temperature greater than about 0° C. (about 32° F.) and less than 250° C. and a pressure greater than 0.15 and less than 1,000 pounds per square inch and subsequently delaminating said aluminum roll stock element from said polymeric substrate, whereby said metallized holographic image is transferred to said aluminum stock element and said holographic image on said polymeric substrate may be reused.

DETAILS OF THE INVENTION

Figure 1:
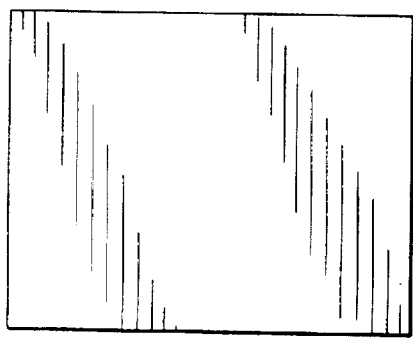
FIG. 1 is a top view of a holographic image prepared by the process described above and contained on a polymeric substrate.

Looking now specifically at the drawings which schematically show the holographic image which is transferable from a polymeric substrate to a more suitable aluminum stock element. FIG. 1 is a top view of an actual holographic image 1 contained on a polymeric substrate. The image has that 3- or 2-D holographic look that is well-known in the prior art, especially in the security art field.

Figure 2:
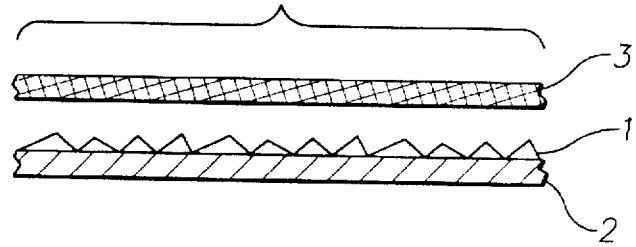
FIG. 2 is a drawing of a side view of FIG. 1. A aluminum stock element is shown directly above the holographic image which is contained on a polymeric substrate in this Figure.

In FIG. 2, a side view drawing of the holographic image 1 from FIG. 2 is shown. In this figure, the polymeric substrate on which the holographic image is manufactured, is shown as 2. An aluminum stock element 3 is shown located directly above the image.

Figure 3:
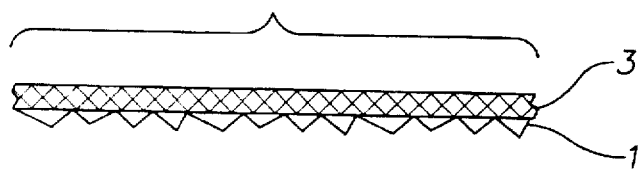
FIG. 3 is a drawing of a side view of a holographic image that has been transferred from the element of FIG. 1 directly to the aluminum stock element of FIG. 2

In FIG. 3, the holographic image I has been transferred to the aluminum stock element 3 and the polymeric substrate 2 is suitable for metallization again.

Figure 4:
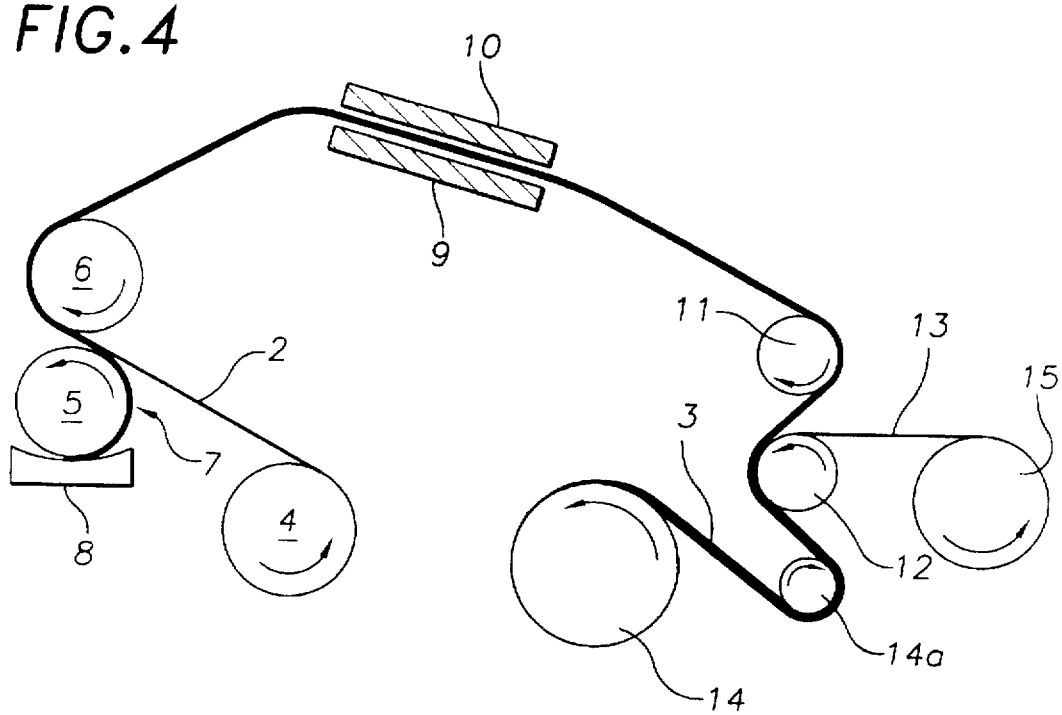
FIG. 4 is a drawing of a schematic process for the lamination of a polymeric substrate containing a holographic image to a roll of aluminum stock.

FIG. 4 is a schematic drawing representing a novel process of this invention for the transfer of a holographic image from a polymeric substrate to a aluminum stock element. In this figure, a holographic image 1 (not seen in this figure) on a polymeric substrate 2 is shown being pulled off an unwind roll 4 in a nip formed by opposing rollers 5 and 6. In this view, roll 5 is a standard gravure coating roll and roll 6 is a backup roll. A gravure doctor blade (to control coating weight) is shown as 7 and a coating pan (holding a standard adhesive solution) is shown as 8. The coated holographic image on a polymeric substrate is then carried through a drier which is indicated as 9 and 10 and subsequently down to heated rolls 11 and 12. In the nip formed by these last two rolls, a roll of aluminum stock 3 is taken from roll 14, contacts the surface of the adhesive containing side of the dried, holographic image 1 contained on a polymeric substrate 2 and is laminated thereto. The rolls, which may be heated or cooled, activate the dried adhesive in order to permit such a lamination to occur. The resulting sandwich 13 is then passed over a chill roll 14a and then taken up by rewind roll 14.

Figure 5:
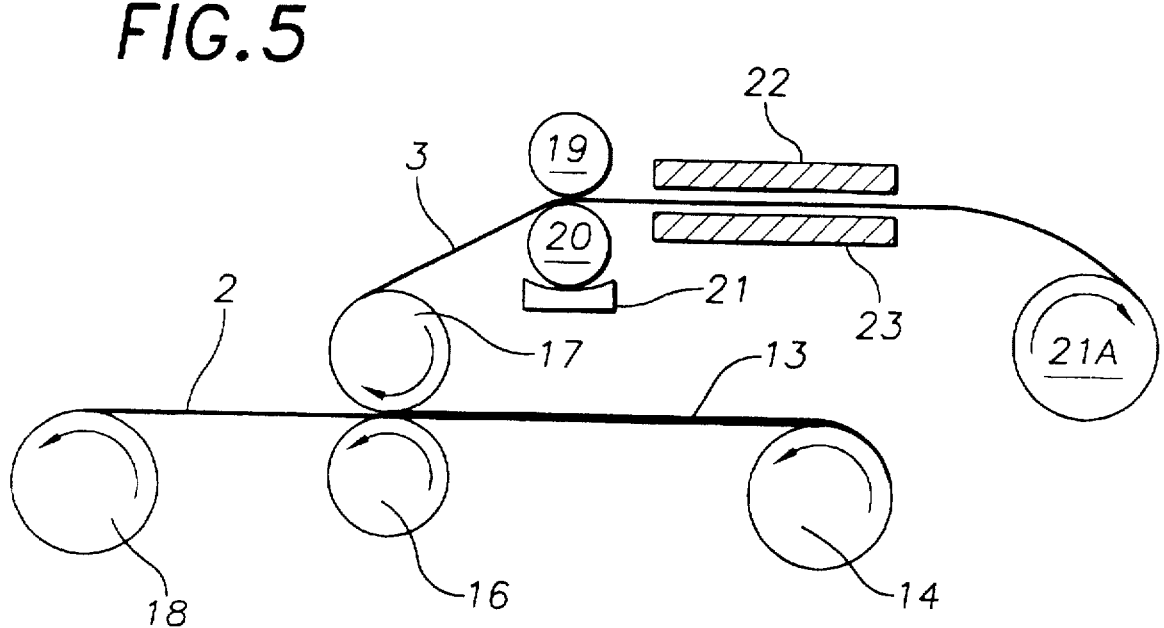
FIG. 5 is a drawing of a schematic process of direct delamination of the polymeric substrate from the aluminum stock element to produce the holographic image of FIG. 2 directly on the aluminum stock element.

The process of delamination is shown in FIG. 5. In this schematic drawing, the laminated sandwich material 13 is drawn off unwind roll 16 and taken through the nip of two delamination rolls 16 and 17. The even pull of the delamination rolls causes the holographic image to transfer from the polymeric substrate 2 to the aluminum stock element 3. It is surmised that the holographic image, which has a glue surface on the top surface thereof, has a stronger affinity for the aluminum stock element 3 than the polymeric substrate 2. The polymeric substrate 2 is then taken up on a film rewind roll 13 (this material can subsequently be reused and recycled by re-metallizing the image that has been etched thereon). The aluminum stock element 3 now carrying the holographic image 1 thereon is taken up to coating heads 19 and 20. A protective layer may be applied over the holographic image contained on this aluminum stock element in order to protect this image during handling. This may be applied at the nip of the coating heads and a pan 21 is graphically shown in this view. The holographic image on the aluminum stock element is then carried into another drier to insure that the protective coating is hardened prior to be rolled up on to a final roll 21. The roll of holographically imaged aluminum stock is now ready to make cans or other containers as is well-known in the art or to make advertisement signs and the like, for example.

Figure 6:
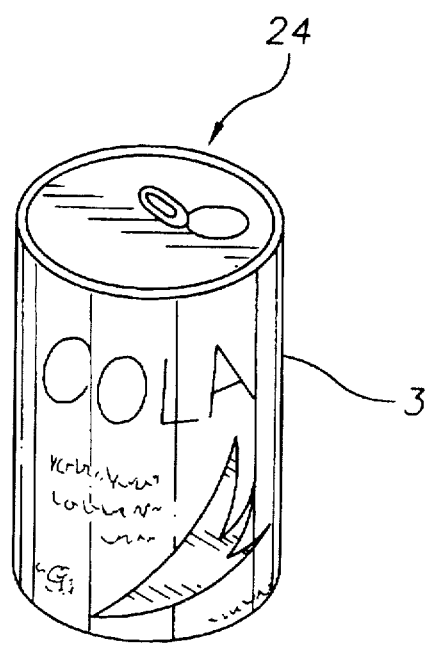
FIG. 6 is a side view of a an aluminum can made from the aluminum stock to which a holographic image has been transferred. In this particular figure, the name of the material inside the can is shown, along with some other writing and advertising.

In FIG. 6, a side view of a typical aluminum can 24 made using the aluminum stock element 3 of this invention is shown. In this particular figure, the can 24 is made to hold a beverage and is labeled holographically with the name of the soft drink and some of the ingredients contained therein. This can is extremely decorative and novel, and a host of other holographic images may be placed thereon following the teachings of this invention. The holographic image, transferred to the aluminum stock element, is flashy and eye catching and this is the first such use thereof. The novel aluminum stock can also be used to make any kind of box or container or sheet to contain advertisement, for example.

Although a variety of temperatures can be used within the ambit of this invention, I prefer a range of temperatures between 0° C. and 250° C. with a range of between 0° C. to 125° C. and more preferably at temperatures of between 25° C. to 100° C. at the nip of the lamination process of this invention. At the same time, a suitable pressure is applied to the nip to cause the two substrates, with the holographic image sandwiched between, to be laminated together. A pressure greater than 0.15 pounds per square inch and up to 1,000 pounds per square inch may be used, although I prefer 5 to 10 pounds per square inch.

It is most important that the temperature of any step of this process not be greater than 250° C. in order not to harm or deform the holographic images in any way. It was previously thought that since the material that made up a holographic image and the glues used therewith, would begin to degrade at 150° C. However, new materials and glues and the like can be heated at even higher temperatures. Looking again at FIG. 4, the conditions in the drier should be such that the surface of the polymeric substrate 2 carrying the holographic image 1 and a layer of adhesive material, be somewhere between 0° C. and 250° C. and most preferably 25 to 125 degrees Centigrade. One can design a drier which has a proper length and can emanate the proper degree of heat to match up with the web speed which is passing through this drier. The heated nip also should have a temperature of between 0° C. and 250° C. The purpose of the chill roll 14a is to set up the adhesive and insure that the aluminum stock element 3 and holographic image 1 on the polymeric substrate 2 is secured. The adhesive material is well-known in the coating art and can be applied at a coating weight of between 0.5 to 14 pounds (dry weight) per ream, wherein a ream is defined as 3,000 square feet of coating surface and the dry weight is defined as the weight of adhesive after the water and/or solvents have been evaporated therefrom, leaving the adhesive solids behind. Within the drawings which make up some of the best modes as envisioned at the time of filing of this invention, the adhesive layer is shown being applied to the holographic image first. Then, the aluminum stock element contacts this layer at the heated nip rolls and is adhered thereto.

The protective layer that is applied over the top of the holographic image that has been transferred to the aluminum stock element by delamination, as shown in FIG. 5, can be any of a host of conventional materials such as solvent or water based acrylics, for example. This protective layer may be colored or tinted to provide requisite color matching to colored aluminum stock layers, for example.

I can use a host of aluminum stock elements within the metes and bounds of this invention. For example, if one wishes to have holographically enhanced can or container for a host elements regular aluminum stock may be used within the ambit of this invention. By aluminum stock I mean that stock which is 3 to 8 mils in thickness, and preferable 4 to 5 mils in thickness. This material is well known in the art and has been conventionally used to make aluminum cans, containers, signs and other elements for sometime. It has been conventional to apply the label to the aluminum stock using an image transfer system or to glue on a label or advertisement or to paint the advertisement or image thereon. No one has been able to successfully laminate a holographic image or decoration on this aluminum. The aluminum cans, containers or signs containing holographic images are highly decorative and hence are a desirable element for this art field.

The conventionally holographically imaged polymeric substrates include many of the commonly available plastics, for example. These will include polyethylenes, polypropylenes, polyethylene terephthalates, among others, for example. These substrates are usually 0.03 to 4.0 mils in thickness.

The aluminum stock elements on which the holographic images have been transferred may be used in a host of applications including the manufacture of cans or containers which will contain any number of conventional items; store or other advertisement sheets; etc. The holographic image may be altered for the use desired. Advertising and decorative images are also envisioned within this invention. Such applications will find wide use within the various industries that employ aluminum stock of this sort.

The ability to dry-bond laminate and then to delaminate the elements described within this invention represents a unique process since it was not widely known that holographic images could be so transferred. The process as described above uses some unique equipment that is designed to hold, laminate and then delaminate aluminum stock elements. It was not known in the prior art to provide such decorative aluminum stock. It is necessary to insure that all of the elements of the process are carefully maintained within processing limits. The use of elements produced within the scope of this invention greatly increases the utility of holographic images within a broader scope. This means that holographic images with larger images, images that can utilize advertising and logos and the like, are now possible.

What is claimed is:

1. A process for transferring a metallized holographic image from a second support to an aluminum roll stock element, said second support comprising in order;
    a. a polymeric support having a holographic image therein;
    b. a metal applied over said holographic image to enhance said holographic image by metallization thereof, said metal forming the metallized holographic image; and,
    c. an adhesive layer coated on said metallized holographic image and subsequently dried, said process comprising the steps of:
        a-1. laminating the dried adhesive layer of said second support to said aluminum roll stock element at a temperature of between 0° C. and 250° C. and a pressure of between 0.15 and 1.000 pounds per square inch; and,
        b-1. delaminating the polymeric support having a holographic image therein from the metallized holographic image to substantially transfer all of said metallized holographic image to said roll stock element, whereby said polymeric support having said holographic image therein is capable of being re-metallized for re-use.

2. The process of claim 1 wherein said temperature is between 25° C. and 125° C. and said pressure is between 0.15 and 10 pounds per square inch.

3. The process of claim 1 wherein said aluminum roll stock element has a thickness of between 3 to 8 mils.

4. The process of claim 1 wherein a protective layer is applied over said transferred metallized holographic image on said roll stock element of b-1.

* * * * *